Sept. 16, 1958     M. MAUERER     2,852,174
AUXILIARY WHEEL-MOUNTED FUEL CAN FOR MOTOR VEHICLE
Filed Dec. 27, 1954     2 Sheets-Sheet 1
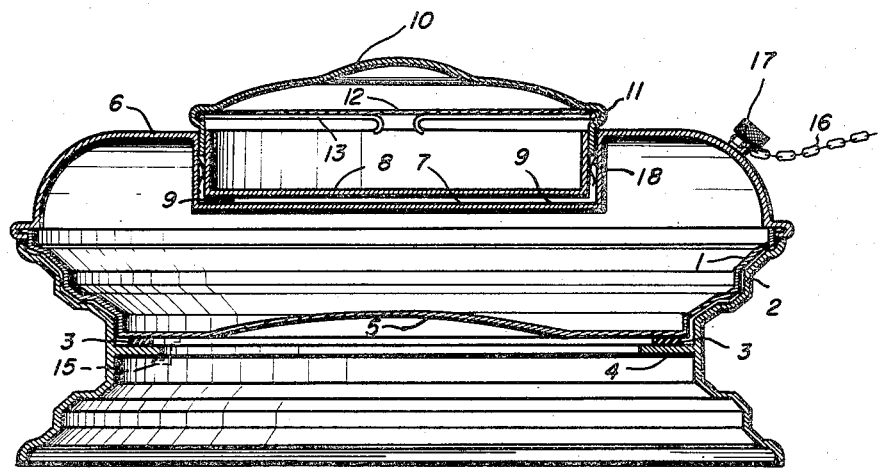
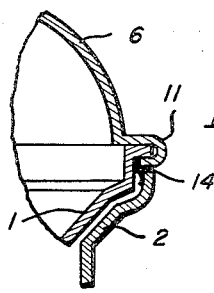
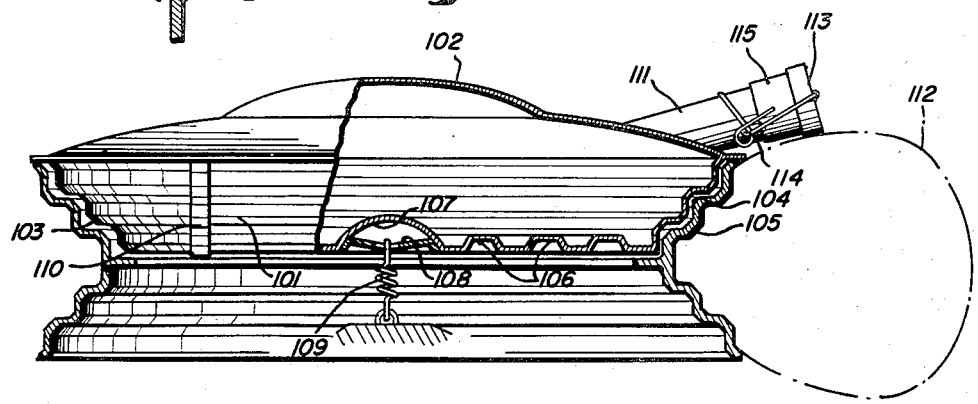
INVENTOR.
MICHAEL MAUERER
BY Toulmin & Toulmin
Attorneys Sept. 16, 1958　　　　　M. MAUERER　　　　　2,852,174
AUXILIARY WHEEL-MOUNTED FUEL CAN FOR MOTOR VEHICLE
Filed Dec. 27, 1954　　　　　　　　　　　　2 Sheets-Sheet 2

INVENTOR
MICHAEL MAUERER
BY
ATTORNEYS

United States Patent Office 2,852,174
Patented Sept. 16, 1958

2,852,174

AUXILIARY WHEEL-MOUNTED FUEL CAN FOR MOTOR VEHICLE

Michael Mauerer, Munich, Germany, assignor of one-half to Elisabeth Mauerer, Munich, Germany Application December 27, 1954, Serial No. 477,726

Claims priority, application Germany December 28, 1953

13 Claims. (Cl. 224—42.14)

This invention relates to an auxiliary fuel container or can for motor vehicles.

Owing to want of room considerable difficulties arise in placing auxiliary cans for fuel, oil, water, and the like in the present light cars. But even in larger vehicles the available luggage compartment is mostly too small to hold an additional can after having received some pieces of luggage.

It has already been tried to stow the known auxiliary cans of cylindrical or rectangular shape into the wheel rim of the spare tire. Owing to their shape, however these cans are not suited for the said purpose. Since most of the petrol stations are installed to sell quantities of 5, 10, 15, etc. liters or gallons, the additional can has to be of a determined volume. This means in the present case that the can, the size of which is dependent on the interior of the wheel rim, either becomes too small or projects beyond the spare tire to such an extent as to make it impossible to achieve the desired saving of space.

According to the present invention it is proposed to adapt the casing of the auxiliary can to the inner profile of the rim in order to avoid the above-described drawbacks. Thus the whole interior of the rim is made use of, the can being of minimum height and maximum volume.

An important feature of the invention resides in the construction and arrangement of the outlet socket or spout of the auxiliary can according to the invention. If the spout is arranged and constructed in an unsuitable way, it will be impossible to refuel the many existing types of motor cars without the aid of special auxiliary means, such as funnels and the like. The filling openings of the fuel tanks are usually mounted in the cars in such a manner that the flat auxiliary cans cannot be emptied completely unless additional means are used, since often the construction of the car body does not permit the can to be inclined and/or turned in the direction necessary for emptying the same.

The present invention avoids this drawback by providing for an arrangement of the outlet socket or spout in the lid, of the auxiliary can, preferably at the edge of the same, at such an angle of inclination that the spout rests upon the rubber casing of the tire and is of such length that it can be introduced into the filling hole of the fuel container without being hindered either by the auxiliary can itself or by the car body.

Although the shape of the auxiliary can ensures its immovable positioning in the rim of the spare tire, it is desired to provide additional fastening means. Thus, the bottom of the can, for instance, may be provided with two or more screw bolts the dimensions and arrangement of which correspond to the bores of the rim, so that the can can be retained in the rim by means of winged nuts screwed on to these bolts.

Furthermore, a holding device may be employed extending across the spare tire, which may either be loosely or rigidly attached to the can and may be fastened on the tire by means of a clamping jaw or the like. Bayonet catches may also be used within the framework of the present invention.

In the case of motor vehicles having a shaft mounted on the car body for holding the spare tire, it is advisable to insert a central tube straight through the can. In this case, the can is mounted by inserting the shaft into the central tube and fastened thereon by means of a winged screw. More possibilities for fixedly attaching the can are shown in the accompanying drawings.

Moreover it is proposed to arrange within or on top of the auxiliary can one or several recessed compartments to be closed by a lid and to provide each compartment and/or its lid with one or several removable open containers. It is desirable to store tools, implements and the like necessary for operating, servicing or repairing motor vehicles as well as sanitary articles in such a way as to make them easily accessible without having to provide extra space for this purpose.

The auxiliary can according to the invention may, for instance, receive the tools in the container set in the recessed compartment and the sanitary material in the lid pertaining thereto. It is also possible to arrange coaxially with the rotation axis of the wheel one compartment each for tools and sanitary material respectively in either side of the auxiliary can.

The open container which is retained in the recessed compartment by means of springs is preferably designed in such a way as to form together with the lid a single removable member. Thus it is possible to remove from the spare tire either the auxiliary can together with the inserted container or said container alone.

The above-mentioned compartments can of course only be arranged in the larger type of auxiliary cans, since the capacity of cans to be mounted in smaller wheel rims is already too limited.

In the drawings two preferred embodiments of the invention are illustrated by way of example.

Figure 1 is a cross section of an auxiliary fuel can according to the invention provided with a compartment for tools and fitted in the rim of a spare tire.

Figure 2 shows an enlarged sector of the rim of the can.

Figure 3 shows an auxiliary can, without a compartment for tools, fitted in the rim of a spare tire.

Figure 4:
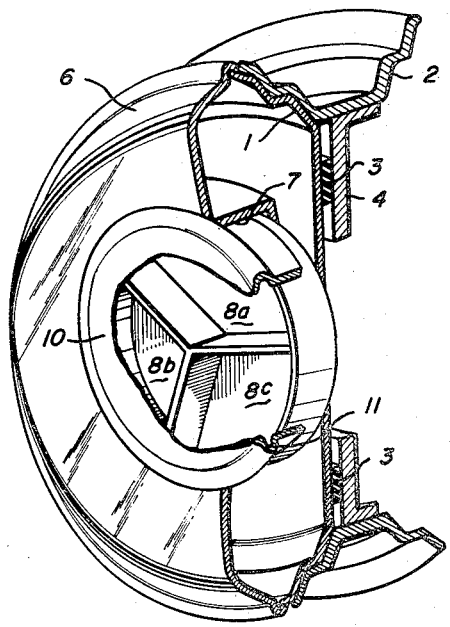
Figure 4 is a perspective view of a portion thereof in section of a modification of the invention as disclosed in Figure 1 wherein the container 8 is provided with a plurality of compartments.

The can according to Figures 1 and 2 has a casing 1 which is shaped to the inner profile of the wheel rim 2 and rests on the rim 4 by means of an inserted rubber ring 3. The casing 1 also has a slightly inwardly vaulted bottom 5 so as to achieve a firm resting surface for the can when the latter is removed from the wheel rim and set down by itself.

The cap 6 of the can which is flangedly connected with the casing 1, is provided with a recessed compartment 7 having a circular or polygonal cross section. Within the compartment 7 an open container 8 is arranged which rests on an elastic supporting surface 9 and is closed by a lid 10. The container 8 may be provided with a plurality of compartments 8a, 8b and 8c as illustrated in Figure 4. The lid 10 has a continuous bead 11 around its edge into which circular bead a disk 12 is inserted which is held in turn by a spring ring 13. The ends of the spring ring are bent inwardly to permit an easy removal of the latter together with the disk, whereby it becomes possible to use the lid 10 as a receptacle.

The open container is retained in the compartment 7 by means of springs 18, the dimensions of which are preferably such as to enable them to hold the container 8 on the one hand as well as the lid 10 alone, when the container is removed, on the other hand.

The auxiliary can is firmly attached to the spare tire by means of springs 14 which are fastened to the upper edge of the casing 1 and press against the inner surface of the upper edge of the wheel rim 2. (See Fig. 2.)

It is also possible to provide as fixing means an angle piece 15 which is arranged on the bottom side of the can. This angle piece 15 holds the wheel rim 4. A tightening strap 16 is attached which spans the spare tire, and which is provided with a holding device in the form of a lever joint (not shown) to the point of the cap of the can diagonally opposite. The said tightening strap may, for instance, be placed about the outlet socket 17 of the can, or it may be fastened in any other conventional way. Thereby the can may be removed from the wheel rim by tilting it.

The auxiliary can illustrated in Figure 3 comprises a bottom part 101 and a lid 102 which are flanged or welded together. A casing 103 of the can is shaped to the inner profile 104 of the wheel rim 105. In order to reinforce the preferably flat bottom of the casing 103 the bottom is provided with annular recess 106. The center of the bottom shows a frusto-spherical recess 107 bridged by a fillet 108 from which a fastening spring 109 may extend to have its other end fastened to a suitable stationary anchor point. In order to prevent the can from rattling, strips 110 of felt or rubber are glued to the casing.

The discharge spout 111 arranged on the lid 102 is provided at such an angle of inclination and projects from the can by such length that it comes to rest upon the rubber casing of the spare tire 112. A closure cap 113 serves for closing the opening of the discharge spout 111, and is provided with a spring lever catch 114. The opening of the discharge spout 111 is provided with a strengthened wall portion 115 which on the one hand enlarges the tightening surface and on the other hand receives the bore for mounting the spring lever catch 114.

Catch 114 is of the type of catch wherein a bail or U-shaped wire engages the cap and has its ends pivoted to a bent lever that is, in turn, pivoted to the wall portion 115.

In closing, catch 114 pulls the cap down on the spout in sealing relation and snaps over center so the resilience of the bail will hold the latch closed. Upon opening, the reverse action takes place.

In general, the shape of the can as well as the fastening devices may be altered according to the respective type of vehicle with which the can is to be used. This modification has been illustrated in Figure 4 and described above.

Figure 5:
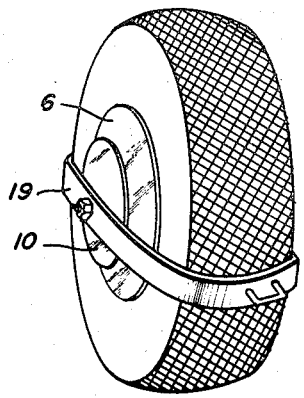
Figure 5 is another embodiment of the auxiliary can according to this invention provided with a holding device extending across the spare tire.

Figure 5 is a further modification of this invention wherein the auxiliary tank is secured within the rim of the spare wheel by a holding device such as a flexible band 19 which extends over and about the spare tire. This flexible band may be made from resilient spring metal.

Figure 6:
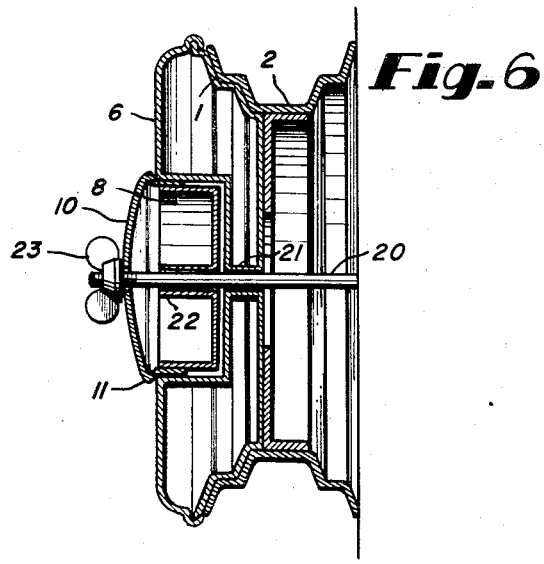
Figure 6 shows a further embodiment of the invention wherein the spare tire is mounted upon a shaft extending from the car body and the auxiliary can is fastened to the shaft.

Another modification of the invention is illustrated in Figure 6. In this modification the spare wheel is mounted upon a shaft 20 which extends outwardly from the car body. The shaft corresponds to the axis of rotation of the spare tire. The fuel can 1 has a tubular passage 21 therein to accommodate the shaft 20. In a like manner the container 8 also has a passage 22 therein to similarly accommodate the shaft 20. The can is secured within the spare wheel by a wing nut 23 which is threaded onto the end of the shaft 20 as illustrated in the drawings.

The auxiliary can according to the invention does not require any additional space in the vehicle. If the lid is decorated with some ornaments the can is even suited for motor scooters where the placing of an additional can would otherwise be considered impossible. The special construction and arrangement of the outlet socket permits all types of vehicles to be refuelled without the aid of other auxiliary means, such as funnels and the like, and the can can be emptied completely.

Moreover additional space for keeping tools, spare parts and sanitary material can be provided by installing further compartments in the can.

What I claim is:

1. A removable auxiliary fuel can for use, in the interior of the rim of a spare wheel and a spare tire mounted thereon, of a motor vehicle, comprising a can casing having a substantially circular bottom portion, a side wall adapted in shape to the shape of the rim of said spare wheel so as to fit closely therein, a cap portion covering said side wall to form a closed can, and a discharge spout mounted in said cap portion and being of substantial length, thereby permitting the can to be emptied completely into the fuel tank of a random type of vehicle free from the use of additional intermediary filling members; said discharge spout being inclined at such an angle to the central axis of rotation of said spare wheel as to rest upon the tire mounted on said spare wheel, said can being removably mounted within the wheel rim, and resilient means connected to the center of the said bottom portion of the can to pull the can resiliently into the said wheel.

2. A removable auxiliary fuel can as described in claim 1, wherein said bottom has a recess extending toward the interior of said can, and a spring attached to said can at the bottom of said recess for securing said can to said spare wheel.

3. A removable auxiliary fuel can as described in claim 1, wherein said bottom is provided with annular stiffening recesses.

4. An auxiliary fuel can as described in claim 1 further comprising a fastening angle provided on the lower side of the can, said fastening angle holding the rim, a tightening strap for spanning the spare tire, and a joint lever catch on said tightening strap fitted to the upper side of the can diagonally opposite said fastening angle.

5. An auxiliary fuel can as described in claim 1 further comprising springs provided on the casing of the can for fastening the same, said springs pressing against the inner surface of the upper edge of the wheel rim when the can is fitted in.

6. An auxiliary fuel can as described in claim 1 wherein said can is provided with a holding device extending over and about the spare tire.

7. An auxiliary fuel can as described in claim 1 further comprising a shaft on the rear of the vehicle for mounting said spare wheel thereon, and a tube through the can in the rotation axis of the latter which tube is adapted to receive said shaft for fastening said can thereon.

8. A removable auxiliary fuel can for use in the interior of the rim of a spare wheel and a spare tire mounted thereon, of a motor vehicle, comprising a can casing having a substantially circular bottom portion, a side wall adapted in shape to the shape of the rim of said spare wheel, and a cap portion covering said side wall to form a closed can; an outlet socket mounted in said cap portion and being of substantial length, thereby permitting the can to be emptied completely into the fuel tank of a random type of vehicle free from the use of additional intermediary filling members; said outlet socket being inclined at such an angle to the central axis of rotation of said spare wheel as to rest upon the tire mounted on said spare wheel, said can being removably mounted within the wheel rim; at least one recessed compartment in said cap portion, and at least one container and lid therefor, removably inserted in said recessed compartment.

9. A removable auxiliary fuel can as described in claim 8, wherein spring means are provided for holding said container in said recessed compartment.

10. A removable auxiliary fuel can as described in claim 8, wherein said lid is provided with a bead around its edge, and comprises a removable disk and a spring ring inserted in said bead around said lid edge.

11. A removable auxiliary fuel can for use, in the interior of the rim of a spare wheel and a spare tire mounted thereon, of a motor vehicle, comprising a can casing having a substantially circular bottom portion, a side wall adapted in shape to the shape of the rim of said spare wheel, a cap portion covering said side wall to form a closed can, and an outlet socket mounted in said cap portion and being of substantial length, thereby permitting the can to be emptied completely into the fuel tank of a random type of vehicle free from the use of additional intermediary filling members; said outlet socket being inclined at such an angle to the central axis of rotation of said spare wheel as to rest upon the tire mounted on said spare wheel, said can being removably mounted within the wheel rim, a plurality of recessed compartments in said cap portion, and a container and lid therefor, removably inserted in each of said recessed compartments.

12. A removable auxiliary fuel can for use, in the interior of the rim of a spare wheel and a spare tire mounted thereon, of a motor vehicle, comprising a can casing having a substantially circular bottom portion, a side wall adapted in shape to the shape of the rim of said spare wheel, a cap portion covering said side wall to form a closed can, and an outlet socket mounted in said cap portion and being of substantial length, thereby permitting the can to be emptied completely into the fuel tank of a random type of vehicle free from the use of additional intermediary filling members; said outlet socket being inclined at such an angle to the central axis of rotation of said spare wheel as to rest upon the tire mounted on said spare wheel, said can being removably mounted within the wheel rim, a recessed compartment in said cap portion, an open container removably inserted in said recessed compartment, a lid adapted to cover said recessed portion and a separate container in said lid.

13. Auxiliary fuel can adapted for mounting within the rim of a spare wheel and spare tire of a motor vehicle according to claim 1, wherein cushion means is provided between the can and the rim on the wheel on the side of the can opposite the said discharge spout whereby the can is prevented from rattling in the rim by the engagement of the cushion means therewith and the engagement of the discharge spout with the tire.

References Cited in the file of this patent

UNITED STATES PATENTS

| | | |
|---|---|---|
| 1,289,472 | King | Dec. 31, 1918 |
| 1,485,975 | Geiglein | Mar. 4, 1924 |
| 1,529,855 | Vallero | Mar. 17, 1925 |
| 1,684,160 | Tinker | Sept. 11, 1928 |
| 2,660,348 | Muller | Nov. 24, 1953 |

FOREIGN PATENTS

| | | |
|---|---|---|
| 455,955 | Italy | Mar. 18, 1950 |
| 510,293 | Belgium | Apr. 15, 1952 |